(12) United States Patent
Takashima et al.

(10) Patent No.: US 7,980,978 B2
(45) Date of Patent: Jul. 19, 2011

(54) HOISTING AND LOWERING DRIVING ENGAGEMENT MULTI-ROW CHAIN

(75) Inventors: Toshihiko Takashima, Osaka (JP); Takeshi Kondo, Osaka (JP); Tomoyuki Saji, Osaka (JP); Hiroko Ishida, Osaka (JP); Masatoshi Sonoda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 461 days.

(21) Appl. No.: 12/290,377

(22) Filed: Oct. 29, 2008

(65) Prior Publication Data
US 2009/0118048 A1   May 7, 2009

(30) Foreign Application Priority Data
Nov. 1, 2007   (JP) .................................. 2007-285153

(51) Int. Cl.
*F16G 13/02* (2006.01)
(52) U.S. Cl. ........................................ 474/230; 474/231
(58) Field of Classification Search .................. 474/230, 474/212, 221, 231
See application file for complete search history.

(56) References Cited

U.S. PATENT DOCUMENTS

| | | | | |
|---|---|---|---|---|
| 2,212,907 | A | * | 8/1940 | Weiss ............................ 474/231 |
| 6,733,410 | B2 | * | 5/2004 | Saito ............................. 474/212 |
| 7,819,389 | B2 | * | 10/2010 | Takeuchi et al. ............... 254/358 |
| 2002/0061800 | A1 | * | 5/2002 | Saito ............................. 474/212 |

FOREIGN PATENT DOCUMENTS

| | | |
|---|---|---|
| JP | 60-45958 | 4/1985 |
| JP | 07-223800 | 8/1995 |
| JP | 10-175796 | 6/1998 |
| JP | 11-049487 | 2/1999 |
| JP | 11-193199 | 7/1999 |
| JP | 11-278797 | 10/1999 |
| JP | 2003-004104 A1 | 1/2003 |
| JP | 2005-083429 A1 | 3/2005 |

* cited by examiner

*Primary Examiner* — Emmanuel M Marcelo
(74) *Attorney, Agent, or Firm* — William P. Oberhardt

(57) ABSTRACT

A hoisting and lowering driving engagement multi-row chain is disclosed, in which bending of the connecting pins in the chain is suppressed to avoid fatigue failure. Additionally, the load carrying balance in the chain width direction is improved, and contact vibrations and contact noises generated between the chain and the hoisting and lowering sprockets are suppressed. Endurance of the bush in the chain is thereby improved. Bending of connecting pins is avoided by press-fitting bushes, through which connecting pins pass, into intermediate tooth plates. This also improves load carrying balance widthwise. Contact noises and vibrations between the bushes and sprockets are suppressed by providing bushes with a separate sprocket engagement portion having a larger diameter than the press-fitting portion of the bushes.

2 Claims, 5 Drawing Sheets

HOISTING AND LOWERING DRIVING ENGAGEMENT MULTI-ROW CHAIN

BACKGROUND OF THE INVENTION

1. Field of the Invention

The present invention relates to a hoisting and lowering driving engagement multi-row chain incorporated into a hoisting and lowering device, which hoists and lowers a hoisting and lowering table in parallel with a set surface for use by production facilities in various kinds of production fields, a transfer facility in a transportation field, a care facility in a medical welfare field, a stage facility in an art field, and the like.

2. Brief Description of the Related Art

In the field of hoisting and lowering devices, there has been a hoisting and lowering device, which hoists and lowers articles to be hoisted and lowered, such as heavy articles, by use of an engagement chain in which a pair of hoisting and lowering engagement type chains is integrally hoisted and lowered while being engaged with each other. This arrangement is also called a chuck chain (see Japanese Laid-Open Patent Publication No. 11-278797, in particular page 1 and FIG. 1).

In the above-mentioned conventional engagement chain, a chain assembling/disassembling operation is facilitated by incorporating a connecting pin to a pin hole of an internal plate by loose fitting, so called gap filling. However, when a high load due to weight of articles to be hoisted and lowered and the like was applied to such an engagement chain, the connecting pin was bent in the clearance generated between the pin hole of the internal plate and the connecting pin. Thus, there was a problem that fatigue failure was liable to occur in the connecting pin. Further, since the connecting pin was bent in the clearance generated between the pin hole of the internal plate and the connecting pin, a high load due to weight of the above-mentioned articles to be hoisted and lowered was concentrated to the respective plates disposed on the outer plate side press-fitted to the connecting pins, for example outer plates and inner plates and the like in the vicinity of the outer plates. As a result there was a problem that the load balance in the chain width direction worsened so that fatigue strength of the chain was reduced.

Further, in the above-mentioned conventional engagement chain, a roller chain has been adopted in which a roller was rotatably fitted onto a bush. Thus, since the roller was loosely fitted onto the bush, there was a problem that the central axis of the roller was off-centered with respect to the central axis of the connecting pin or the bush at the time of engagement with a sprocket so that contact vibrations or contact noises were generated between the roller and the sprocket. Consequently, the engagement state between the pair of engagement chains generated a shift due to such contact vibrations between the roller and the sprocket, and as a result, there was a problem that the vibrations generated due to the shift in such an engagement state were transmitted to articles to be hoisted and lowered.

Further, since in the above-mentioned engagement chain, the roller was molded separately from the bush, an insufficient wall thickness was obtained, and there was a problem that fatigue failure of the roller was likely to occur when a high load was applied between the roller and the sprocket when articles to be hoisted and lowered such as heavy articles were hoisted.

Accordingly, the present invention has been made for solving the prior art problems, that is, the object of the present invention is to provide a hoisting and lowering driving engagement multi-row chain in which bending of a connecting pin is suppressed to avoid fatigue failure, and at the same time the load carrying balance in a chain width direction is improved. Contact vibrations, and contact noises generated between the chain and a hoisting and lowering sprocket are suppressed, and the endurance of a bush is improved.

BRIEF SUMMARY OF THE INVENTION

The invention described herein solves the above-mentioned problems by utilizing a hoisting and lowering driving engagement multi-row chain in which inner link units each include a pair of right and left spaced hook-shaped inner tooth plates and a pair of front and rear bushes press-fitted into said inner tooth plates, which are disposed in parallel to each other through hook-shaped intermediate tooth plates in a chain width direction. Said inner link plates are connected to each other in a large number by pairs of front and rear connecting pins press-fitted into pairs of front and rear pin holes of hook-shaped outer tooth plates disposed on outermost sides in the chain width direction. Oppositely disposed inner tooth plates, outer tooth plates, and intermediate tooth plates in the oppositely disposed hoisting and lowering driving engagement multi-row chains are respectively engaged with each other by a pair of hoisting and lowering sprockets, which engage with said bushes, and deflect the oppositely disposed hoisting and lowering driving engagement multi-row chains from a horizontal direction to a vertical direction in an engaged state, so that they are integrally hoisted in a self-standing engaged state. Said inner tooth plates, said outer tooth plates, and said intermediate tooth plates are respectively disengaged from each other and branched apart while deflecting from the vertical direction to the horizontal direction by said pair of hoisting and lowering sprockets. The intermediate tooth plates are press-fitted to the respective connecting pins.

The invention disclosed herein also solves the above-mentioned problems in that, in addition to the configuration described above, the bush integrally includes a plate side press-fitting portion, press-fitted into said inner tooth plate, and a sprocket engagement portion, having a larger diameter than said plate side press-fitting portion.

In the present invention, inner link units each include a pair of right and left spaced hook-shaped inner tooth plates and a pair of front and rear bushes press-fitted into said inner tooth plates, disposed in parallel with each other through hook-shaped intermediate tooth plates in a chain width direction, and said inner link plates are connected to each other in a large number by pairs of front and rear connecting pins press-fitted into pairs of front and rear pin holes of hook-shaped outer tooth plates disposed on outermost sides in the chain width direction. Inner tooth plates, outer tooth plates, and intermediate tooth plates opposed to each other are respectively engaged with each other by a pair of hoisting and lowering sprockets, which engage with said bushes, and deflect the oppositely disposed hoisting and lowering driving engagement multi-row chains from a horizontal direction to a vertical direction in an engaged state, so that they are integrally hoisted in a self-standing engaged state. Said inner tooth plates, said outer tooth plates, and said intermediate tooth plates are respectively disengaged from each other and branched apart while deflecting from the vertical direction to the horizontal direction by said pair of hoisting and lowering sprockets. The hoisting and lowering operations of articles to be hoisted and lowered are rapidly attained at an equal speed in accordance with the rotation of a hoisting and lowering sprocket. Since the inner link units are disposed in parallel to each other in a chain width direction, the outer tooth plates, the inner tooth plates, and the intermediate tooth plates are respectively engaged with each other multiply and strongly over a plurality rows in a chain width direction so that buckling liable to occur in the chain width direction is reliably suppressed and an engagement balance with the hoisting and lowering sprocket in the chain width direction is improved. Additionally, the following significant benefits can be obtained.

According to the hoisting and lowering driving engagement multi-row chain of the present invention, since the intermediate tooth plate is press-fitted to the connecting pin, even if a high load due to weight of articles to be hoisted and lowered is applied to a hoisting and lowering driving engagement multi-row chain, the bending of the connecting pin is suppressed by removal of the clearance between the pin hole of the intermediate tooth plate and the connecting pin. Thus, fatigue failure liable to occur due to bending of the connecting pin is prevented. Since the clearance between the pin hole of the intermediate tooth plate and the connecting pin is removed as described above, bending of the connecting pin is suppressed. The respective plates disposed on the intermediate tooth plate side, for example, an intermediate tooth plate and an inner tooth plate in the vicinity of the intermediate tooth plate and the like receive a high load due to weight of articles to be hoisted and lowered. Therefore, the load carrying balance in the chain width direction is remarkably improved so that the fatigue strength of the chain can be improved.

According to the hoisting and lowering driving engagement multi-row chain invention described herein, since the bush integrally includes a plate side press-fitting portion, press-fitted into the inner tooth plate, and a sprocket engagement portion, having a larger diameter than the plate side press-fitting portion, in addition to the benefits obtained by the hoisting and lowering driving engagement multi-row chain previously described, the hoisting and lowering driving engagement multi-row chain of the present invention stably comes into contact with a hoisting and lowering sprocket at the specified outer circumferential surface of the sprocket engagement portion integrally molded with the bush. Thus, the generation of contact vibrations and contact noises between an engagement chain and a hoisting and lowering sprocket due to off-centering of the central axis of the roller with respect the central axis of the connecting pin or the bush at the engagement with the sprocket as in a conventional engagement chain using rollers can be prevented. This prevention of contact noises between the bush and the hoisting and lowering sprocket avoids the generation of a difference between engagement states between a pair of hoisting and lowering driving engagement multi-row chains; therefore, a stable hoisting and lowering operation can be realized without providing articles to be hoisted and lowered with vibrations generated due to the difference between such engagement states, and torque of the hoisting and lowering sprocket can be efficiently transmitted to the hoisting and lowering driving engagement multi-row chain.

Further, since the bush includes a sprocket engagement portion having a larger diameter than the plate side press-fitted portion, the sprocket engagement portion in the hoisting and lowering driving engagement multi-row chain of the present invention ensures more sufficient wall thickness by integrally molding the sprocket engagement portion with the bush than a conventional engagement chain utilizing a roller, in which the roller is separately molded from the bush and therefore cannot ensure a sufficient wall thickness. Thus, the sprocket engagement portion exhibits high load resistance to a load applied when articles to be hoisted and lowered are heavy articles so that the generation of fatigue failure in the bush can be prevented.

Furthermore, since in the hoisting and lowering driving engagement multi-row chain of the present invention, rollers are not used and the number of parts of the chain are reduced, the burden associated with assembling and disassembling operation such as connection and disconnection of the chain can be reduced.

DETAILED DESCRIPTION OF THE INVENTION

Figure 1:
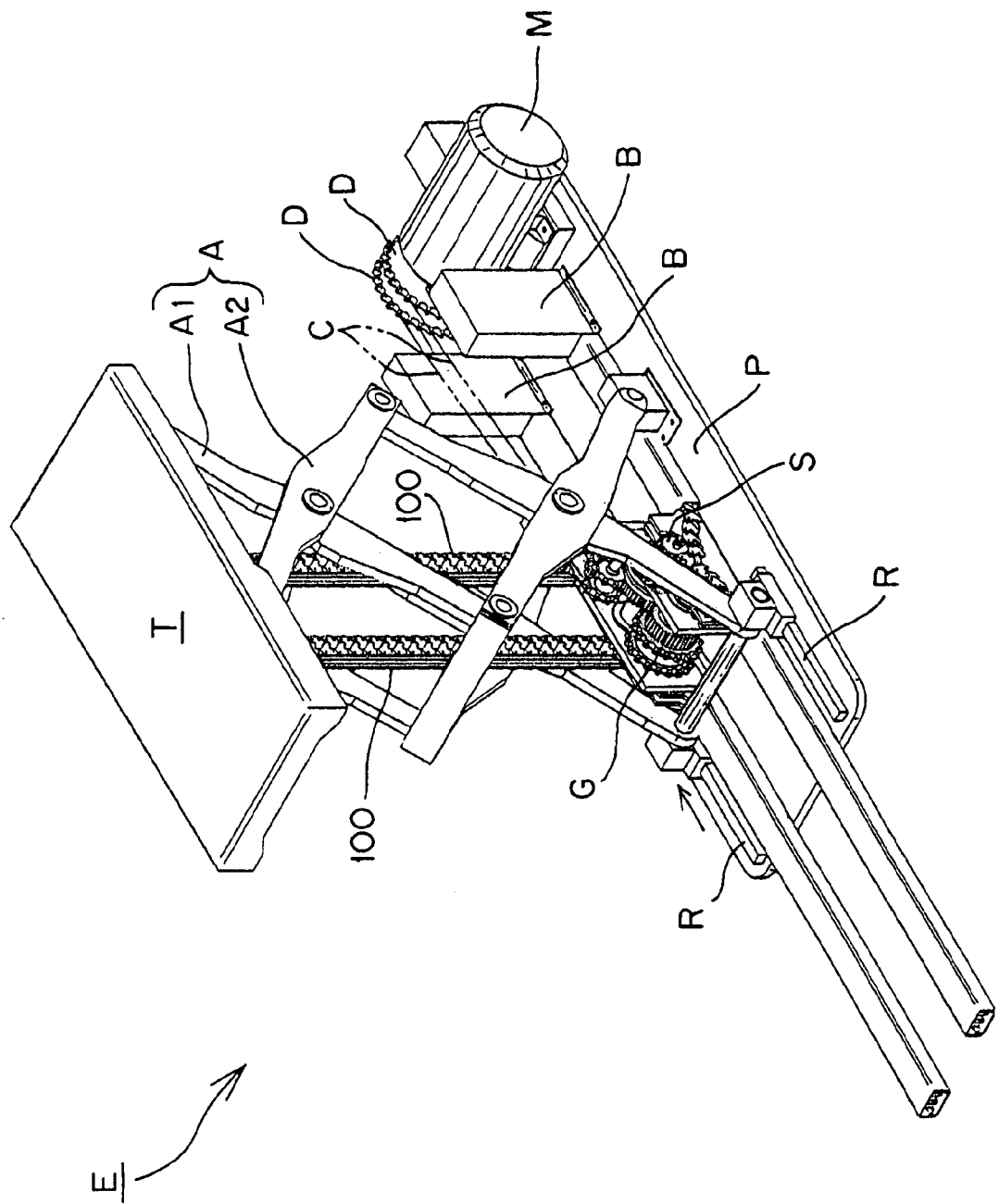
FIG. 1 is a perspective view of an embodiment of the hoisting and lowering driving multi-row chain of the present invention in use in an engagement type hoisting and lowering device.

If in a hoisting and lowering driving engagement multi-row chain in which inner link units, each including a pair of right and left spaced hook-shaped inner tooth plates and a pair of front and rear bushes press-fitted into the inner tooth plates, are disposed in parallel to each other through hook-shaped intermediate tooth plates in a chain width direction, and the inner link plates are connected to each other in a large number by pairs of front and rear connecting pins press-fitted into pairs of front and rear pin holes of hook-shaped outer tooth plates disposed on outermost sides in the chain width direction, and the inner tooth plates, outer tooth plates, and intermediate tooth plates opposed to each other are respectively engaged with each other while each oppositely disposed by a pair of hoisting and lowering sprockets, which engage with said bushes, and deflect the hoisting and lowering driving engagement multi-row chains from a horizontal direction to a vertical direction in an engaged state, so that they are integrally hoisted in a self-standing engaged state, and the inner tooth plates, said outer tooth plates, and the intermediate tooth plates of the hoisting and lowering driving engagement multi-row chains are respectively disengaged from each other to be branched while deflecting from the vertical direction to the horizontal direction by the pair of hoisting and lowering sprockets, the intermediate tooth plate is press-fitted to said connecting pins, so that bending of the connecting pins is suppressed and fatigue failure is avoided and at the same time the load carrying balance is improved, contact vibrations and contact noises between a bush and a hoisting and lowering sprocket are suppressed and the endurance of the bush is improved, any particular embodiments of the present invention may be adopted.

For example, any particular shapes of the inner tooth plate, the outer tooth plate, and the intermediate tooth plate may be adopted if they integrally hoist in a self-standing engaged state while engaging with the same kinds of plates opposed to each other and deflecting from the horizontal direction to the vertical direction, and they disengage from each other to be branched while deflecting from the vertical direction to the horizontal direction.

Further, in the hoisting and lowering driving engagement multi-row chain of the present invention, although the number of rows of inner link units disposed in parallel to each other in the chain width direction is usually two or three, even four or more rows may be adopted.

In an engagement chain type hoisting and lowering device into which the hoisting and lowering driving engagement multi-row chain of the present invention is incorporated, there are no problems in a hoisting and lowering operation even if a setting surface of the device is a floor surface, which becomes a stationary type setting form, or is a ceiling surface, which becomes a hanging type setting form. The device has no problems in an advancing and retracting operation, which corresponds to a hoisting and lowering operation.

A hoisting and lowering driving engagement multi-row chain 100, which is an example of the present invention, will be described with reference to drawings.

First, a hoisting and driving engagement multi-row chain 100, which is a first embodiment of the present invention, is used by being incorporated into an engagement chain type hoisting and lowering device E set on an operating floor surface in a stationary state for hoisting and lowering a hoisting and lowering table T on which articles to be hoisted and lowered such as heavy articles (not shown) are loaded in parallel with a set surface as shown in FIG. 1.

Figure 2:
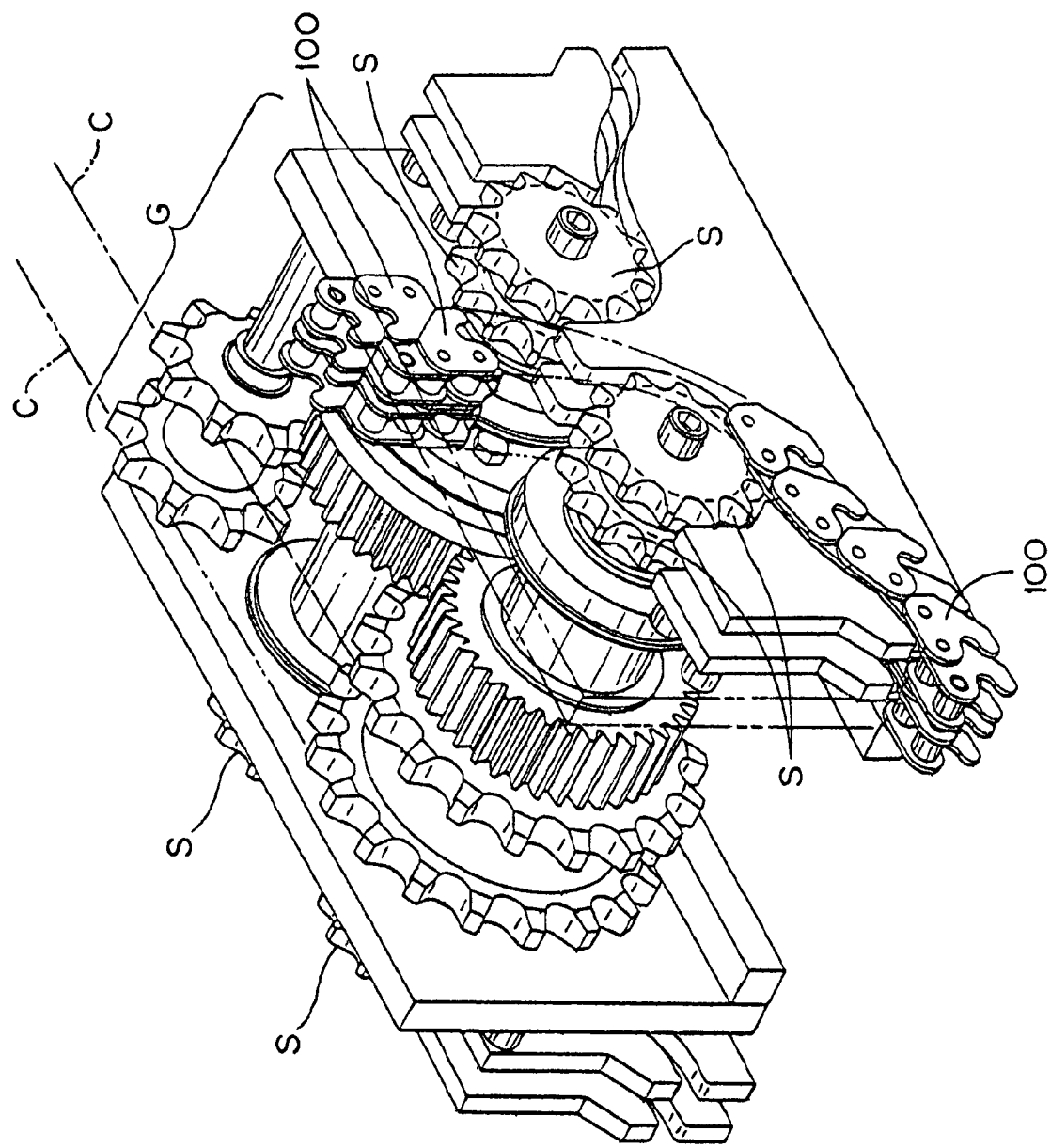
FIG. 2 is an enlarged perspective view of the embodiment of the invention shown in FIG. 1 in use in an engagement type hoisting and lowering device where the hoisting and lowering table and a pantograph arm are removed from the embodiment of FIG. 1.

The above-mentioned engagement chain type hoisting and lowering device E includes, as shown in FIGS. 1 and 2, a base plate P mounted on a set surface where the above-described hoisting and lowering table T is hoisted and lowered in parallel with the set surface, a pair of hoisting and lowering sprockets S, which rotate positively and reversely in opposite directions while facing each other in the same plane about a pair of rotation shafts arranged in parallel with the base plate P, a pair of hoisting and lowering driving engagement multi-row chains 100, which are engaged by this pair of hoisting and lowering sprockets S to hoist and lower the hoisting and lowering table T, the above-mentioned hoisting and lowering table T securely attached to an upper end of the hoisting and lowering driving engagement multi-row chains 100, and a driving motor M, which drives the pair of hoisting and lowering sprockets S, as basic device configurations.

It is noted that the reference marks D shown in FIGS. 1 and 2, denote a pair of driving sprockets coaxially arranged on an output shaft side of the driving motor M, the reference marks C denote a pair of power transmission chains composed of roller chains for transmitting power from the driving sprockets D to a side of a pair of hoisting and lowering sprockets S, the reference marks G denote a speed change gear group, which transmits power from the pair of power transmission chains C to the pair of hoisting and lowering sprockets S so that one directional rotation is changed and positive and reverse rotations are performed in opposite directions to each other, the reference mark A denote upper and lower two steps connected hoisting and lowering auxiliary guide means composed of an inner arm A1 and an outer arm A2, a so-called X-shaped pantograph arm provided between the hoisting and lowering table T and a set surface side base plate P, the reference mark R denotes a slide where a lower end of the inner arm A2 is slid in accordance with a hoisting and lowering operation, and the reference mark B denotes a winding type chain accommodating box, which accommodates one of a pair of hoisting and lowering driving engagement multi-row chain 100 when disengaged from each other and branched.

Figure 3:
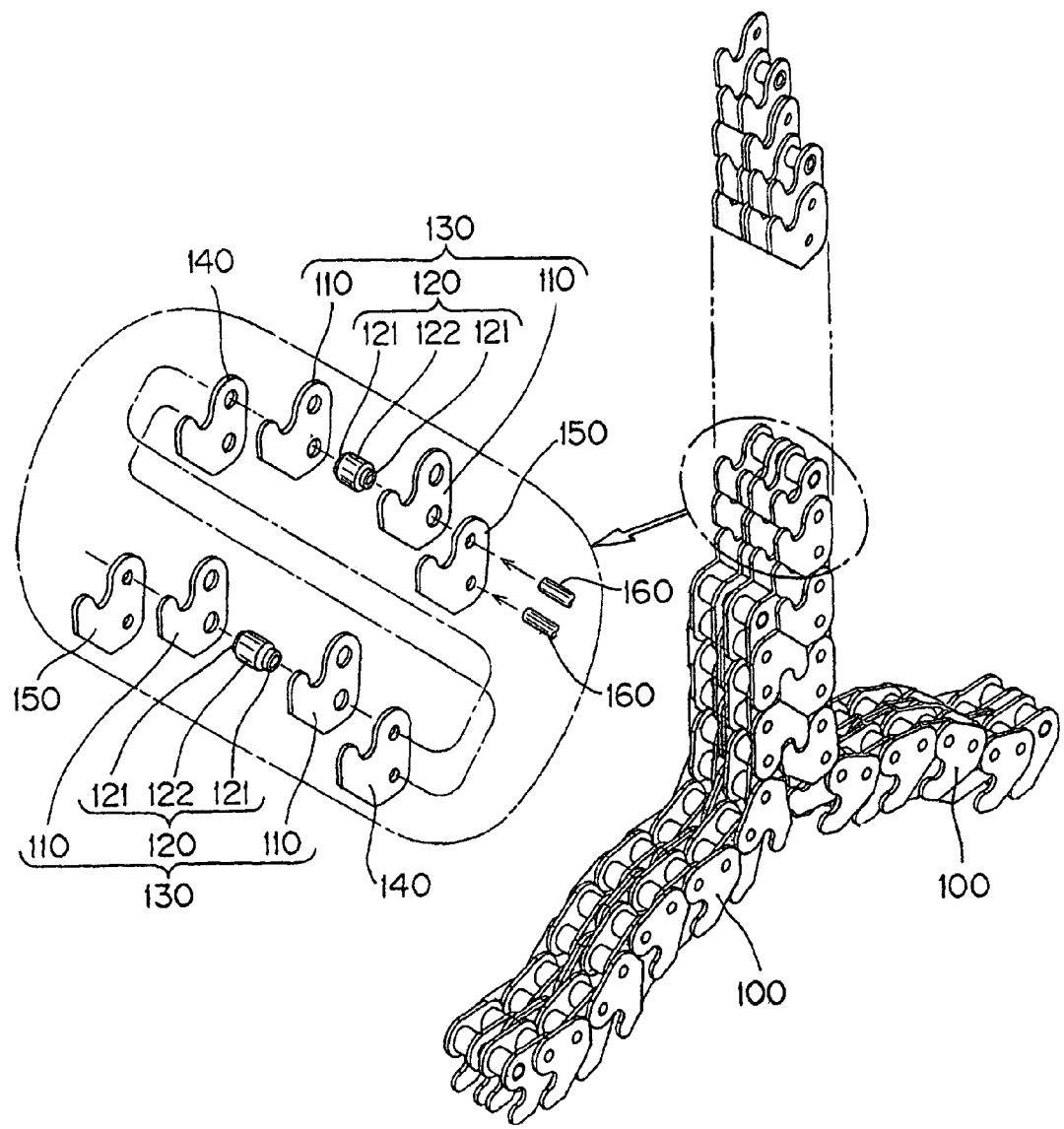
FIG. 3 is an enlarged view of a portion of the hoisting and lowering driving engagement multi-row chain of the embodiment of the invention shown in FIG. 1.
Figure 4:
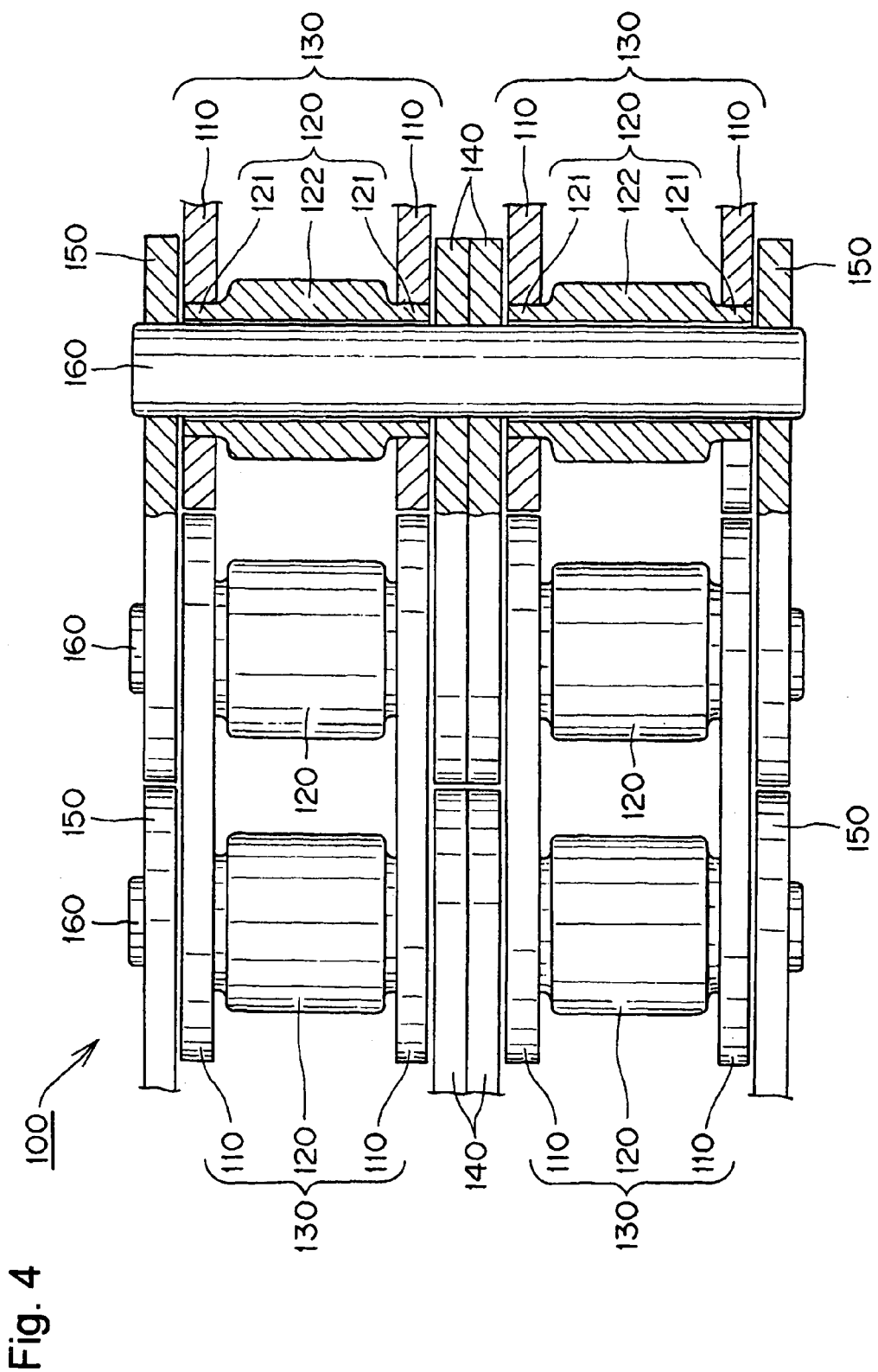
FIG. 4 is a partial cross-sectional top view of a hoisting and lowering driving engagement multi-row chain of the embodiment of the invention shown in FIG. 1.
Figure 5:
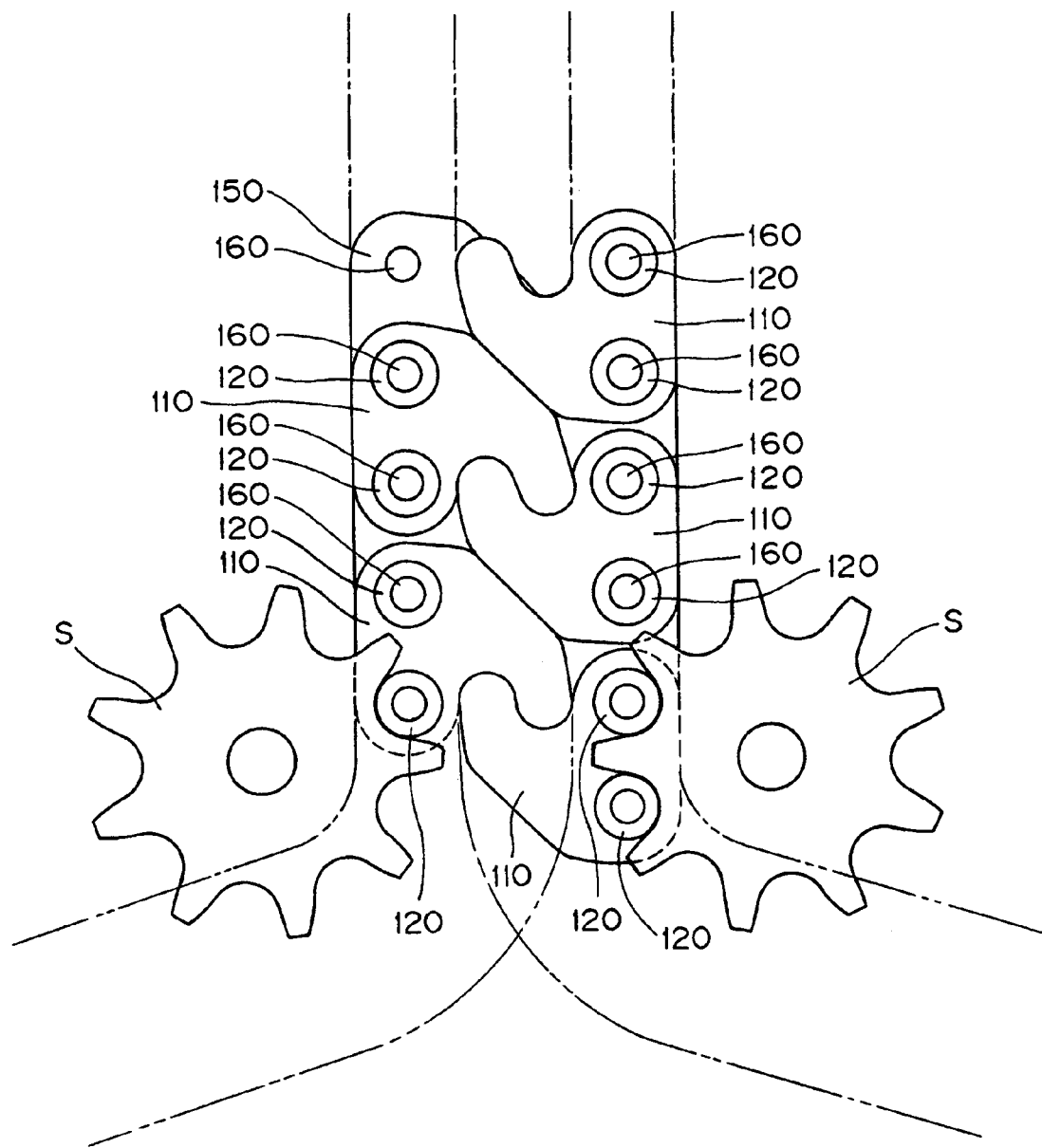
FIG. 5 is a partial schematic side view showing an engagement state between a hoisting lowering driving engagement multi-row chain and a hoisting and lowering sprocket of the embodiment of the invention shown in FIG. 1.

The hoisting and lowering driving engagement multi-row chain 100 of the present embodiment, used in a pair in the engagement chain type hoisting and lowering device E, is a so-called chuck chain. As shown in FIGS. 3 to 5, in the hoisting and lowering driving engagement multi-row chain 100, inner link units 130 each include a pair of right and left spaced hook-shaped inner tooth plates 110 and a pair of front and rear bushes 120 press-fitted into the inner tooth plates 110, which are disposed in parallel with each other through two hook-shaped intermediate tooth plates 140 in the chain width direction, and a number of inner link units are connected to each other in the longitudinal direction of the chain by pairs of front and rear connecting pins 160 press-fitted into pairs of front and rear pin holes of hook-shaped outer tooth plates 150 disposed on the outermost sides in the chain width direction.

And since the inner link units 130 are disposed in parallel with each other in the chain width direction as described above, an outer tooth plate 150, an inner tooth plate 110, and an intermediate tooth plate 140 forming one of the pair of hoisting and lowering driving engagement multi-row chains 100 engage with an outer tooth plate 150, an inner tooth plate 110, and an intermediate tooth plate 140 forming the other of the pair of the hoisting and lowering driving engagement multi-row chains 100 opposed to the former of the hoisting and lowering driving engagement multi-row chains 100, over a plurality of rows in the chain width direction in a hooked-shaped manner, respectively, in a so-called chuck-shaped manner, multiply and strongly, so that the buckling otherwise liable to occur in the chain width direction of the hoisting and lowering driving engagement multi-row chain 100 is reliably suppressed and an engagement balance with a hoisting and lowering sprocket S in the chain width direction can be improved.

Further, the pair of hoisting and lowering driving engagement multi-row chains 100 are respectively oppositely disposed to the above-mentioned pair of hoisting and lowering sprockets S, as shown in FIGS. 3 to 5, so that respectively facing inner tooth plates 110, outer tooth plates 150, and intermediate tooth plates 140 are engaged with each other to be integrally hoisted in a self-standing engaged state. In the pair of hoisting and lowering driving engagement multi-row chains 100, the inner tooth plates 110, the outer tooth plates 150, and the intermediate tooth plates 140 are disengaged from each other and branched while deflecting from the vertical direction to the horizontal direction by use of the above-mentioned pair of hoisting and lowering sprockets S.

The particular forms of an intermediate tooth plate 140, a connecting pin 160, and a bush 120, which are the most characteristic in the hoisting and lowering driving engagement multi-row chain 100 of the present embodiment, will be described in more detail with reference to FIGS. 3 to 5.

First, the intermediate tooth plate 140 is incorporated into the connecting pin 160 by being press-fitted thereto in a so called interference fit as shown in FIG. 4. Thus, even if a high load due to the weight of articles to be hoisted and lowered acts upon the hoisting and lowering driving engagement multi-row chain 100, bending of the connecting pin 160 is suppressed so that fatigue failure liable to occur by bending of the connecting pin 160 can be prevented.

Further, the removal of the clearance between the pin hole of the intermediate tooth plate 140 and the connecting pin 160 suppresses bending of the connecting pin 160 and the respective plates disposed on the intermediate tooth plate 140 side, for example, an intermediate tooth plate 140 and an inner tooth plate 110 in the vicinity of the intermediate tooth plate 140 and the like receives a high load due to weight of articles to be hoisted and lowered.

Further, the bush 120 integrally includes a plate side press-fitted portion 121 press-fitted into the inner tooth plate 110 and a sprocket engagement portion 122 of a larger diameter than this plate side press-fitted portion 121.

When the bush 120 is engaged, it stably comes into contact with a hoisting and lowering sprocket S at a specified outer circumferential surface of the sprocket engagement portion 122 as shown in FIG. 5. Therefore, the generation of contact vibrations and contact noises due to the off-centering of the central axis of a roller with respect to the central axis of the connecting pin or bush at the time of engagement with the sprocket as in a conventional engagement chain using the roller is prevented.

Further, the sprocket engagement portion 122 in the hoisting and lowering driving engagement multi-row chain 100 is integrally molded together with the bush 120 so that more sufficient wall thickness can be ensured as compared with a conventional engagement chain using rollers in which a sprocket engagement portion is separately molded from the bush and a sufficient wall thickness cannot be ensured. As a result, this sprocket engagement portion 122 exhibits a high load resistance to a load, which is applied when articles to be hoisted and lowered such as heavy articles are hoisted.

In the thus obtained hoisting and lowering driving engagement multi-row chain 100 of the present embodiment, the intermediate tooth plate 140 is press-fitted to the connecting pin 160.

Therefore, even if a high load due to the weight of articles to be hoisted and lowered is applied to a hoisting and lowering driving engagement multi-row chain 100, the bending of the connecting pin 160 is suppressed by removal of the clearance between the pin hole of the intermediate tooth plate 140 and the connecting pin 160. Thus, fatigue failure liable to occur due to bending of the connecting pin 160 is prevented. Since the clearance between the pin hole of the intermediate tooth plate 140 and the connecting pin 160 is removed as described above, the bending of the connecting pin 160 is suppressed, the respective plates disposed on the intermediate tooth plate 140 side, for example, an intermediate tooth plate 140 and an inner tooth plate 110 in the vicinity of the intermediate tooth plate 140 and the like receive a high load due to weight of articles to be hoisted and lowered. Therefore, the load carrying balance in the chain width direction is remarkably improved so that the fatigue strength of the chain can be improved.

In the hoisting and lowering driving engagement multi-row chain 100, the bush 120 integrally includes a plate side press-fitted portion 121, press-fitted into the inner tooth plate 110, and a sprocket engagement portion 122, having a larger diameter than the plate side press-fitting portion 121.

Thus, a hoisting and lowering driving engagement multi-row chain 100 of the present invention stably comes into contact with a hoisting and lowering sprocket S at a specified outer circumferential surface in a sprocket engagement portion 122 integrally molded with the bush 120. Consequently, the generation of contact vibrations and contact noises between an engagement chain and a hoisting and lowering sprocket due to off-centering of the central axis of the roller with respect the central axis of the connecting pin or the bush at the engagement with the sprocket as in a conventional engagement chain using rollers, is prevented.

And since this prevention of contact noises between the bush 120 and the hoisting and lowering sprocket S avoids the generation of a difference between engagement states between a pair of hoisting and lowering driving engagement multi-row chains 100, a stable hoisting and lowering operation can be realized without providing articles to be hoisted and lowered with vibrations generated due to the difference between such engagement states, and torque of the hoisting and lowering sprocket S can be efficiently transmitted to the hoisting and lowering driving engagement multi-row chains 100.

Further, the bush 120 includes a sprocket engagement portion 122 having a larger diameter than the plate side press-fitted portion 121.

Thus, the sprocket engagement portion 122 in the hoisting and lowering driving engagement multi-row chain 100 of the present invention ensures more sufficient wall thickness by integrally molding the sprocket engagement portion 122 with the bush 120 than a conventional engagement chain adopting a roller, which is separately molded from a bush and therefore cannot ensure a sufficient wall thickness. Thus, the sprocket engagement portion 122 exhibits high load resistance to a load applied when articles to be hoisted and lowered are heavy articles so that the generation of fatigue failure in the bush 120 can be prevented.

Since in the hoisting and lowering driving engagement multi-row chain 100 of the present invention rollers are not used and the number of parts of the chain can be reduced, the burden of the assembling and disassembling operation such as connection and disconnection of the chain can be reduced. Therefore the benefits of the present invention are very significant.

We claim:

1. A hoisting and lowering driving engagement multi-row chain in which inner link units, each including a pair of right and left spaced hook-shaped inner tooth plates and a pair of front and rear bushes press-fitted into said inner tooth plates, are disposed in parallel to each other through hook-shaped intermediate tooth plates in a chain width direction, and said inner link plates are connected to each other by pairs of front and rear connecting pins press-fitted into pairs of front and rear pin holes of hook-shaped outer tooth plates disposed on the outermost sides of the hoisting and lowering driving engagement multi-row chain in the chain width direction, wherein when a pair of said hoisting and lowering driving engagement multi-row chains are positioned such that said inner tooth plates, outer tooth plates, and intermediate tooth plates of said pair of hoisting and lowering driving engagement multi-row chains are opposed to each other while each of said pair of hoisting and lowering driving engagement multi-row chains is oppositely disposed to a pair of hoisting and lowering sprockets, which engage with said bushes, and which deflect each of said pair of said hoisting and lowering driving engagement multi-row chains from a horizontal direction to a vertical direction, said oppositely disposed inner tooth plates, oppositely disposed outer tooth plates, and oppositely disposed intermediate tooth plates of each of said oppositely disposed pair of said hoisting and lowering driving engagement multi-row chains become engaged with each other upon deflection from horizontal direction to the vertical direction whereby the pair of oppositely disposed hoisting and lowering driving engagement multi-row chains are integrally hoisted together in a self-standing engaged state, and said inner tooth plates, said outer tooth plates, and said intermediate tooth plates of each of said pair of hoisting and lowering driving engagement multi-row chains are respectively disengaged from each other to be branched while deflecting from the vertical direction to the horizontal direction by said pair of hoisting and lowering sprockets, wherein the improvement comprises:

said intermediate tooth plates are press-fitted to said connecting pins.

2. A hoisting and lowering driving engagement multi-row chain according to claim 1, wherein the improvement further comprises said bushes further including an integral press-fitting portion, press-fitted into said inner tooth plates, and a sprocket engagement portion, having a larger diameter than said plate side press-fitting portion.

* * * * *